Aug. 8, 1961 M. LOOMIS ET AL 2,994,894
LOADING RAMP
Filed March 30, 1956 2 Sheets-Sheet 1

INVENTORS
MARTIN LOOMIS
LEON M. ABBOTT
BY
Fearman & Fearman
ATTORNEYS

Aug. 8, 1961 M. LOOMIS ET AL 2,994,894
LOADING RAMP
Filed March 30, 1956 2 Sheets-Sheet 2
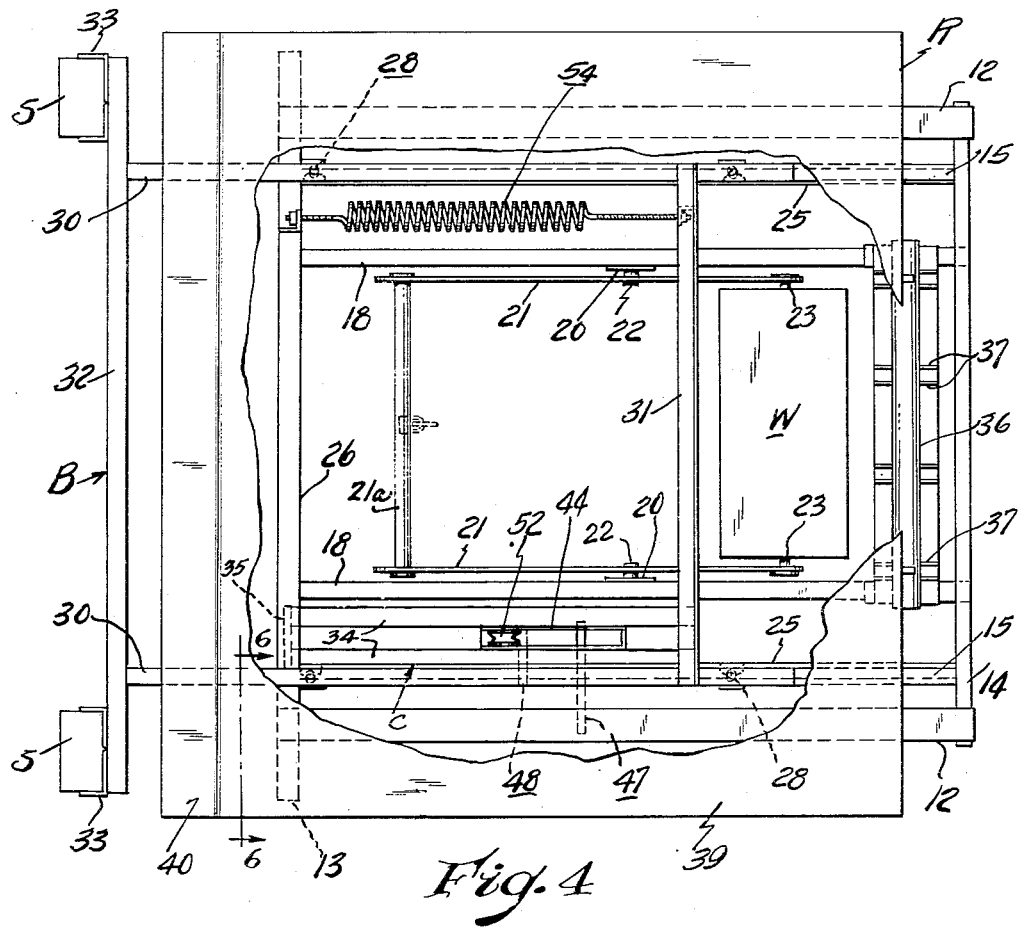
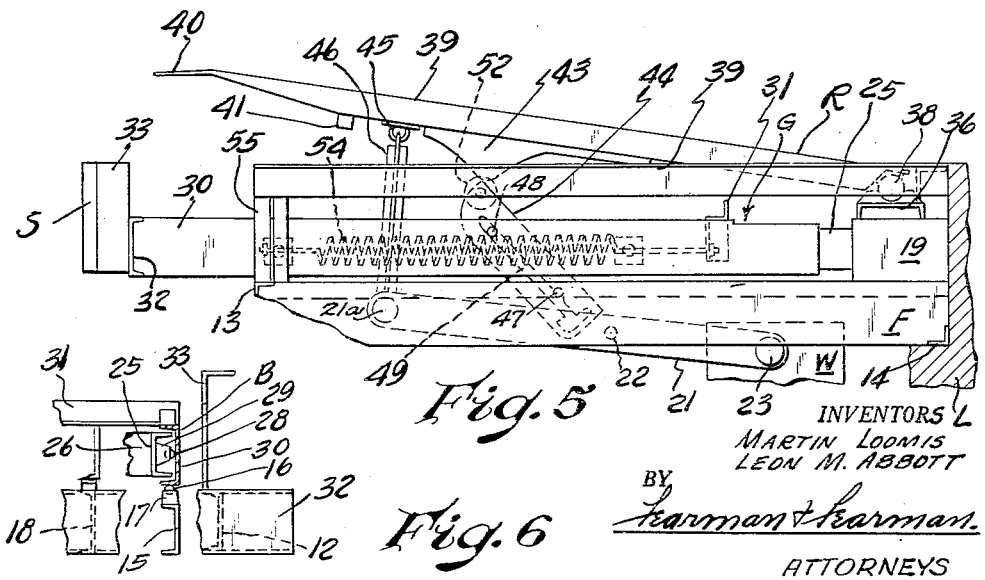
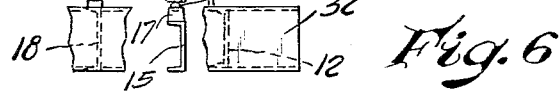
INVENTORS
MARTIN LOOMIS
LEON M. ABBOTT
BY
Fearman & Fearman
ATTORNEYS

2,994,894
LOADING RAMP
Martin Loomis, Clare, and Leon M. Abbott, Sanford, Mich., assignors to Loomis Machine Company, Clare, Mich., a corporation of Michigan
Filed Mar. 30, 1956, Ser. No. 575,012
11 Claims. (Cl. 14—71)

This invention relates to automatic truck actuated loading ramps of the type used to bridge the space between a truck, trailer, or other vehicle and a loading dock or platform.

One of the prime objects of the invention is to design a very simple, practical and economical vehicle-actuated, self-leveling loading ramp, operable by backing movement of a truck or vehicle to lift the ramp floor and permit the truck to back beneath it, after which the ramp floor automatically lowers to the floor of the vehicle so that loads may be freely transported from truck to dock or vice versa.

Another object of the invention is to provide a vehicle actuated ramp, in which the ramp automatically swings to elevated position when the vehicle moves away from the platform, and thence down level with the floor of the platform, so that trucks may be operated thereover or merchandise stored thereon.

A further object is to design a ramp for facilitating the loading or unloading of automotive trucks or trailers which are backed up to a platform or dock to receive and/or discharge freight, either by manual loading and unloading operation, or by use of lift trucks adapted to carry the freight from the vehicle onto the platform, or remove same therefrom.

Still a further object of the invention is the employment of automatic truck-actuated mechanism causing the free end of the movable floor of the ramp to swing upwardly and thence downwardly after the end of a truck positioned therebeneath, so that the height of the free end which rests on the truck floor, will adjust itself properly to the height of the vehicle floor, incident to the varying adjustments of the height of the latter as loads are removed or placed thereon.

A further object still is to design a sturdy vehicle-actuated ramp which is operable, even though the truck does not back up square with the bumper.

With the above and other objects in view, the present invention consists of the combination and arrangement of parts, hereinafter more fully described, illustrated in the accompanying drawings, and particularly pointed out in the appended claims, it being understood that changes may be made in the form, size, proportion, and minor details of construction without departing from the spirit or sacrificing any of the advantages of the invention.

In the drawings:

FIG. 4 is a top plan view of the ramp, the floor being broken away to show the counterweight and other mechanism.

FIG. 5 is a side elevational view similar to FIG. 3, showing the ramp floor in raised position.

FIG. 6 is a fragmentary detailed front elevational view taken on the line 6—6 of FIG. 4.

Figure 1:
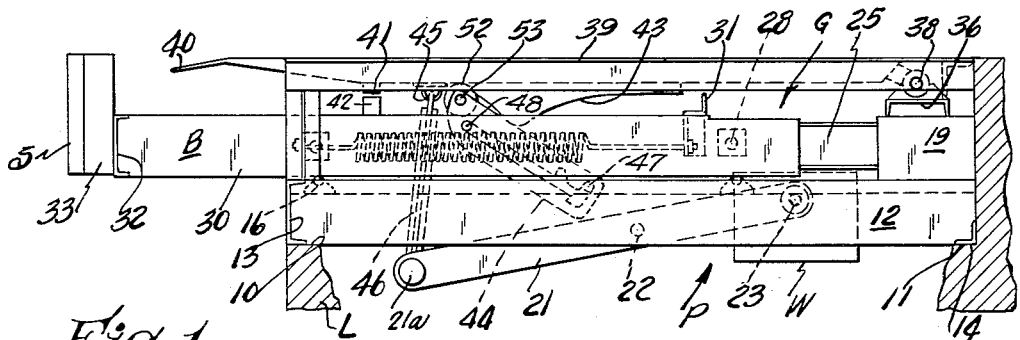
FIG. 1 is a side elevational view of the loading ramp, the ramp floor being shown flush with the face of the loading dock and the bumper frame in extended position.

Automatic loading ramps of the nature herein referred to are designed to bridge space from a vehicle to any kind of a dock or platform, the ramp floor being actuated by movement of the vehicle which engages the ramp bumper frame when backing into position with relation to the loading dock.

Referring now more particularly to the drawings in which we have shown the preferred embodiment of our invention, the letter L indicates a dock or platform in which a pit P is provided to accommodate a ramp mechanism R, shoulders 10 and 11 being provided in the wall of the pit as shown, and on which the ramp base frame F is mounted, said base frame comprising a pair of longitudinally extending members 12 connected by front and rear channel frame members 13 and 14 which rest on the shoulders 10 and 11 of the pit. Other longitudinally disposed channel members 15—15 span the frame F and spaced apart ball rollers 16, mounted in blocks 17 are mounted on the top face of the members 15—15.

Similar longitudinally disposed channels 18—18 span the beams 13 and 14, and blocks 19 are secured to the upper face thereof and for a purpose to be presently described.

Plates 20—20 are secured to the channels 18 at a point intermediate their length and bars 21—21 are pivotally connected thereto by means of stub shafts 22 provided on the members 18, a counterweight W being pivotally secured to the rear ends of the bars 21—21 by means of pins 23. The forward ends of the bars 21 are connected by a rod 21a.

A center guide frame G is superposed on the main frame F and comprises longitudinally disposed parallel members 25—25 rigidly connected to transversely disposed members 26. Ball members 28 are mounted in the holders 29 secured to the web of the channels 25—25 in spaced apart relation, said balls projecting beyond the leg of the channels as shown.

A bumper frame B is mounted on the center guide frame G and comprises longitudinally disposed members 30—30, an angle 31 connecting the rear ends of the guide frame and a channel 32 connecting the front ends. Vertically disposed angles 33 are secured to the face of the member 32 and form a holder for a rubber bumper strip S or the like as shown in FIG. 4.

A cam housing C is mounted adjacent one leg of the bumper frame B, and comprises spaced apart channels 34—34 connected at one end of the cross beam 31, with a plate 35 connecting the opposite ends.

The bumper member B is slidable on this center guide frame, the members 30 embracing the members 25 and bearing against the balls 28, the lower leg of the members 30 riding on the balls 16 and it will thus be obvious that the bumper will roll free and easy due to this anti-friction mounting.

A tranversely disposed channel 36 mounted on the blocks 19 spans the rear ends of the center guide frame and the ramp member R is pivotally connected to ears 37 on said channel by means of pins 38 so as to enable the ramp to swing through an arc about the axes of the pins 38.

This ramp comprises a floor or deck 39, the front end being downwardly bent as at 40 and foot elements or lugs 41 are provided on the lower face of the ramp for engagement with and support by similar lugs 42 provided on the arms 30 of the bumper frame, a cam 43 being provided on the lower face of the ramp and having a cam surface for engagement by force transmitting means such as a cam control lift arm 44, and in a manner to be presently described.

An eye bolt 45 is provided on the lower face of the ramp, and a link 46 serves to connect the rod 21a and ramp.

A pin 47 secured to the frame part 12 spans the cam housing C and the lift arm 44 is journaled thereon, a similar pin 48 secured to a bumper frame channel 30 also spanning the housing. The lifter arm 44 is formed with an elongated slot 49 having a laterally extending branch slot 50 opening therein, the lower end of the slot having opposed offsets 51 and a cam follower or roller 52 is journaled on a pin 53 provided in the upper end of the arm 44, the follower 52 being capable of traversing the contour of the cam 43.

A spring 54 is connected to the members 26 and 31, the ends being threaded to provide for adjustment, this spring serving to force the bumper frame outwardly to its original position when the truck moves away from the ramp.

Vertically disposed angles 55 are provided on the member 13 directly adjacent the ends thereof and form a support for the side edges of the ramp floor 39.

Figure 2:
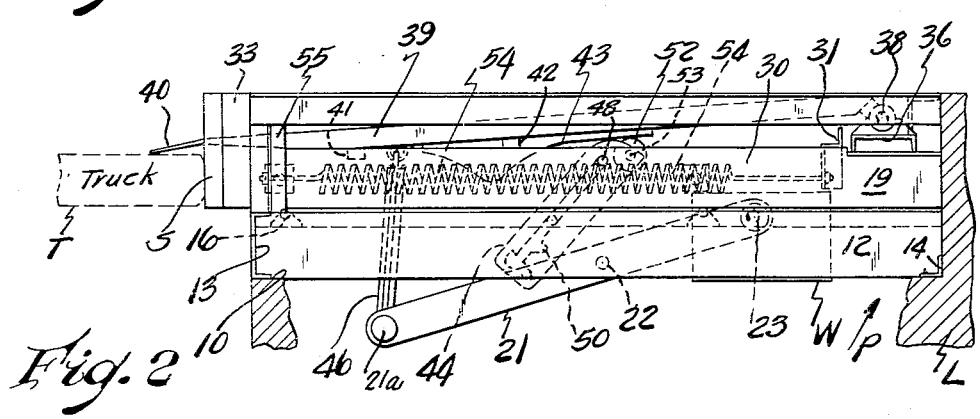
FIG. 2 is a view similar to FIG. 1, the broken lines showing the rear end of a truck or other vehicle, and the bumper frame forced inwardly so that the ramp floor rests on the floor of the truck.
Figure 3:
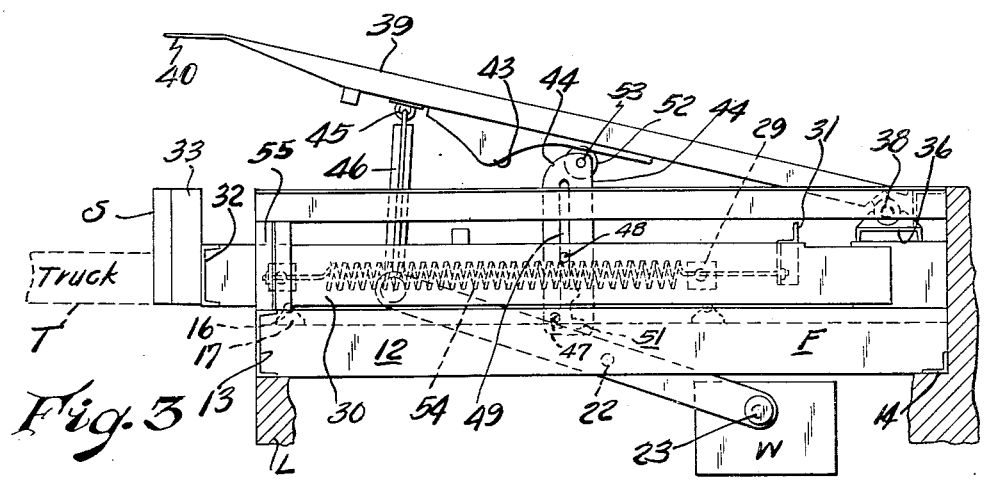
FIG. 3 is also a similar view showing the ramp floor in elevated position.

The operation of the loading dock is as follows:

With the bumper frame B in position shown in FIG. 1 of the drawings, the truck T backs against the bumper blocks S, forcing the bumper frame rearwardly on the center guide frame G, this rearward movement causing the lift arm 44 to pivot about the pivot pin 47, the pin 48 sliding in the slot 49 with the roller 52 engaging the cam 43 and forcing the ramp upwardly, as clearly shown in FIG. 3 of the drawings. The rearward movement of the bumper frame also causes corresponding movement of the ramp supporting elements 42. Continued movement of the bumper frame rearwardly to a predetermined point causes further movement of the lifter arm 44 to disengage the pin 47 from the slot 51 and permit the lifter arm to drop as it is being moved rearwardly, thereby releasing the lifting force applied to the ramp, and permitting lowering of the ramp by gravity under control of the counterweight W, onto the floor of the truck as shown in FIG. 2 of the drawings.

When the truck moves forwardly the spring 54 forces the bumper B outwardly until it is fully extended, and the lifter arm 44 is in place ready for the next truck. This action also raises the ramp, and then lowers it until it is supported in a substantially horizontal position by the elements 41, 42, i.e., in a position level with the floor of the dock or platform ready for cross-over traffic or temporary storage up to its rated capacity. Further, the lip of the ramp is protected by the bumper which extends beyond said lip.

In the event the truck should back up tight to the dock and trip the ramp, letting it come down and then move part way out far enough to let the ramp swing below the level of the truck, but not sufficiently far to permit the lifter arm to engage, and then back up again, the secondary lifting position becomes effective which moves the ramp approximately eight (8) inches above dock level and there is no damage to the mechanism.

From the foregoing description it will be obvious that we have perfected a very simple, practical, and relatively inexpensive automatic dock loader.

What we claim is:

1. A dockboard construction comprising a ramp member having a forward end and a rearward end; means at said rearward end of said ramp member for pivotally supporting said ramp member for swinging movement of said ramp member through an arc; a bumper frame member; means mounting said bumper frame member beneath said ramp member for movement of said bumper frame member from a first position in which its forward end extends beyond said forward end of said ramp member for engagement by a vehicle having a load carrying bed to be loaded or unloaded, to a second position in which said forward end of said ramp member projects beyond the forward end of said bumper frame member; supporting means reacting between said bumper frame member and said ramp member for supporting the latter in substantially horizontal position when said bumper frame member is in said first position; and operating means reacting between said bumped frame member and said ramp member in response to movement of said bumper frame member from said first position towards said second position for swinging said ramp member upwardly from said horizontal position to such position that said forward end of said ramp member is adapted to be located above the level of the load carrying bed of the vehicle so as to prevent damaging said forward end of said ramp member by the bed of said vehicle.

2. The construction set forth in claim 1 wherein said supporting means comprises an element secured to said ramp member and extending towards said bumper frame member, and means carried by said bumper frame member in a position to engage and support said element when said bumper frame member is in said first position.

3. The construction set forth in claim 1 wherein said operating means comprises cam means including a first part connected to said bumper frame member for movement therewith and extending towards said ramp member, and a second part on said ramp member extending towards said bumper frame member, said second part being located in the path of movement of said first part.

4. The construction set forth in claim 3 wherein one of said parts comprises a cam and the other of said parts comprises a lever having a cam follower thereon.

5. A dockboard construction comprising a ramp member having a forward end and a rearward end; means at said rearward end of said ramp member for pivotally supporting said ramp member for swinging movement of said ramp member through an arc; a bumper frame member; means mounting said bumper frame member beneath said ramp member for movement of said bumper frame member from a first position in which its forward end extends beyond said forward end of said ramp member for engagement by a vehicle having a load carrying bed to be loaded or unloaded, to a second position in which said forward end of said ramp member projects beyond said forward end of said bumper frame member; a foot element mounted on the lower surface of said ramp member and extending towards said bumper frame member; a supporting element on said bumper frame member against which said foot element may bear when said bumper frame member is in said first position to support said ramp member in substantially horizontal position, said supporting element being movable with said bumper frame member to said second position so as to prevent its supporting said foot element; and operating means reacting between said bumper frame member and said ramp member in response to movement of said bumper frame member from said first position toward said second position for swinging said ramp member upwardly from said horizontal position to such position that said forward end of said ramp member is adapted to be located above the level of the load carrying bed of the vehicle so as to prevent damaging the forward end of said ramp member by said bed.

6. The construction set forth in claim 5 wherein said operating means comprises cam means including a first part connected to said bumper frame member for movement therewith and extending towards said ramp member, and a second part on said ramp member extending towards said bumper frame member, said second part being located in the path of movement of said first part.

7. A dockboard construction comprising a ramp member having a forward end and a rearward end; means for supporting said ramp member normally in substantially horizontal position and including a hinge at the rearward end of said ramp member for enabling said ramp member to be swung upwardly in an arc; a bumper frame member having a forward end and a rearward end; means mounting said bumper frame member for movement from a first position in which the forward end of said bumper frame member extends beyond said forward end of said ramp member for engagement by a vehicle having a load carrying bed to be loaded or unloaded, to a second position in which said forward end of said ramp member overlies said forward end of said bumper frame member; and force transmitting means reacting between said members and operable in response to movement of said bumper frame member from said first position towards said second position to exert a force against said ramp member to swing the latter upwardly to a position in which said forward end of said ramp member is adapted to be located above the level of the load carrying bed of the vehicle so as to prevent damaging said forward end of said ramp member by the bed of said vehicle.

8. The construction set forth in claim 7 wherein said means for supporting said ramp member in substantially horizontal position includes a part connected to said ramp member and another part connected to said bumper frame member, said parts being so positioned on their respective members as to be in engagement when said bumper frame member is in said first position.

9. A longitudinally disposed dockboard construction for compensating for differences in height of a loading dock and a vehicle having a load carrying bed to be loaded or unloaded and for bridging a gap between the dock and the vehicle bed comprising; an assembly consisting of a ramp member having front and rear ends, and a longitudinally movable bumper member normally located in a first frontmost position in which it is adapted to project considerably beyond the dock for engagement with a vehicle backing toward the ramp member; means, including a hinge near the rear end of said ramp member, for supporting said ramp member normally in substantially horizontal position at a level adapted to correspond substantially to dock level; means mounting said bumper member for movement rearwardly from said first position; and force transmitting means reacting between said members and operable in response to rearward movement of said bumper member from said first position to exert a lifting force swinging the ramp member upwardly to a position where said forward end of the ramp member is adapted to be located above the level of the load carrying bed of the vehicle; said force transmitting means also being operable in response to further movement of said bumper member to withdraw said lifting force from the ramp member once the latter has been swung upwardly and permit the ramp member to swing downwardly to such a position that the front end of the ramp member may be substantially level with the load carrying bed of the vehicle and may rest thereon.

10. The construction set forth in claim 9 wherein said means for supporting said ramp member in substantially horizontal position includes a part connected to said ramp member and another part connected to said bumper member, said parts being so positioned on their respective members as to be in engagement when said bumper member is in said first position.

11. The construction set forth in claim 9 wherein said means for supporting said ramp member in substantially horizontal dock level position includes a part on said bumper member engaging said ramp member when the latter is in said substantially horizontal position and movable from ramp member supporting position in response to said rearward movement of said bumper frame member to enable said forward end of said ramp member to be located at a lower level than when said ramp member is in substantially horizontal position.

References Cited in the file of this patent

UNITED STATES PATENTS

| 2,751,615 | Kelley | June 26, 1956 |

FOREIGN PATENTS

| 75,684 | Denmark | Mar. 23, 1953 |
| 726,124 | Great Britain | Mar. 16, 1955 |